United States Patent [19]

Lewis et al.

[11] Patent Number: 4,826,036
[45] Date of Patent: May 2, 1989

[54] NOZZLE DAM SEALING SYSTEM

[75] Inventors: John T. Lewis, Ringgold, Ga.; Harold R. Zumbrun, Soddy, Tenn.

[73] Assignee: Combustion Engineering, Inc., Windsor, Conn.

[21] Appl. No.: 128,235

[22] Filed: Dec. 3, 1987

[51] Int. Cl.$^4$ ............................................. F16L 55/12
[52] U.S. Cl. .................................. 220/232; 220/239; 138/93
[58] Field of Search .................. 220/232, 234, 239; 138/89, 93, 97; 29/157 C; 277/34; 217/78

[56] References Cited

U.S. PATENT DOCUMENTS

| 1,710,439 | 4/1929 | Taylor | 138/93 |
| 3,834,422 | 9/1974 | Larson | 138/93 |
| 4,250,926 | 2/1981 | Satterthwaite | 138/93 |
| 4,342,336 | 8/1982 | Satterthwaite | 138/93 |
| 4,482,076 | 11/1984 | Wentzell | 220/232 |
| 4,483,457 | 11/1984 | Schukei et al. | 138/93 |
| 4,518,015 | 5/1985 | Fischer | 138/93 |
| 4,656,714 | 4/1987 | Evans et al. | 29/157 C |

FOREIGN PATENT DOCUMENTS 1399 of 1904 United Kingdom .

Primary Examiner—David T. Fidei
Attorney, Agent, or Firm—John H. Mulholland

[57] ABSTRACT

A nozzle dam 14 has an integral diaphragm 50 and peripheral seal 58 radially engaged by bladder 46 to seal against the nozzle dam surface 12. The bladder receives force from a surface 44 on a plunger member 42. The plunger member 42 moves with the nozzle dam securing pin 32 as it seats in socket 40. A manual toggle type action clamp 20 actuates the pin 32.

6 Claims, 2 Drawing Sheets

NOZZLE DAM SEALING SYSTEM

FIELD OF THE INVENTION

The present invention relates to an improvement in nozzle dams for steam generators of the type in association with a conventional nuclear power generating system. Nozzle dams are used to provide a temporary liquid tight seal in a nozzle of a steam generator to isolate the generator from the nuclear reactor with which it is associated.

BACKGROUND OF THE INVENTION

To employ a plug to affect blockage of a normally open flow passage for repair purposes has been known in the prior art in connection with many types of fluid flow systems. Examples of expansible plugs or dams of the prior art may be found in U.S. Pat. Nos. 2,843,154; 3,834,422; and 4,518,015. From these concepts, which are generally applicable to flow passageways, nozzles plugs for steam generators of conventional nuclear power generating systems have developed. An example of such a nozzle plug for effecting a temporary blockage of a passage into or out of a nuclear power system steam generator will be found in U.S. Pat. No. 4,482,076 to Timothy H. Wentzell, assigned to Combustion Engineering, Inc., the assignee of the instant invention.

Periodically, there arises a need to conduct maintenance on, and to effect minor repairs of, the internal components of the steam generator. To accomplish such tasks, it is necessary for one or more persons to physically enter the steam generator. Ingress and egress to and from the steam generator by such persons is accomplished through suitable means such as, for example, an access port or manway. While such persons are working in the steam generator, it is desirable that a blockage of the inlet and outlet nozzle of the steam generator be effected to ensure that there will be no fluid flow through the steam generator which might physically imperil the people working therein.

One such design of a nozzle plug for a nuclear steam generator is disclosed in the U.S. Pat. No. 4,482,076 mentioned above. In that design, a plurality of plate sections or segments are assembled within the steam generator to form the plug or nozzle dam. U.S. Pat. No. 4,483,457 to Schukei and Tade discloses a variation from the Wentzell patent in that it provides for the segments of the nozzle dam to be hinged together.

Both of these patents teach dams which rely upon inflatable seals that require a regulated air supply. See also U.S. Pat. No. 4,656,714. The air supply lines go through the manway and make entry and exit difficult for workers. In addition, there are situations where the hoses and fittings are inadvertently damaged, and since the system remains connected to the air supply lines to maintain pressure on the diaphragm and within the inflatable seal around the periphery of the diaphragm, this can cause leakage.

Moreover, in order to inflate the diaphragm and seals, air lines must be connected from the diaphragm to a regulated air supply outside the primary head of the heat exchanger. The obstruction caused by the air lines in the manway slows down the work effort in the high radiation area of the primary head cavity and is, therefore, extremely detrimental. The removal of the air lines from the work area in the primary head cavity and the manway would provide a much more efficient work area. The nozzle dam system could be greatly simplified if there could be an elimination of the prior art air supply system for sealing nozzle dams.

SUMMARY OF THE INVENTION

The present invention provides a seal for nozzle dams which does not require a regulated air supply system, and thus: eliminates air lines that go through the manway and inhibit the entry and exit of workers; eliminates the hoses and fittings in the work area in the primary head thereby decreasing radiation exposure and increasing worker efficiency; and eliminates the cost of setting up and maintaining a regulated air supply system.

The passive nozzle dam sealing system of the invention utilizes a combined mechanical and hydraulic system that exerts a radial force to press the diaphragm peripheral seals against the nozzle wall. The nozzle dam is assembled or unfolded on its hinges inside the primary head cavity. This requires a three-segment construction for a typical inlet nozzle and a two-piece construction for a typical outlet nozzle. The nozzle dam of the invention is composed of aluminum bulkhead components that are quickly secured together by one of the known prior art methods and fitted with a molded rubber diaphragm with an integral peripheral fluid filled sealing ring. The fluid filled bladder may be integral with the rubber diaphragm or appropriately segmented around the periphery of the bulkhead segments. Each section of the aluminum bulkhead contains segments that have mechanical assemblies that are manually actuated to exert a radial force against the seal, insert a pin into a pocket in the nozzle wall and provide retention of the diaphragm in proper position.

Each mechanical assembly is composed of a straight line toggle type action clamp, a fluid filled bladder either segmented or in the form of a continuous fluid filled peripheral seal around the diaphragm, and a plunger that transmits the force from the straight line clamp to the bladder as it inserts a pin end into a keeper pocket in the nozzle wall. The clamp is typically a type known as Model 640 and sold by "DE-STA-CO" Division of Dover Resources, Inc. Thus, a single force applied to the clamp handle seats a pin in the pocket in the nozzle wall and exerts an equalized force on the diaphragm through the load distribution characteristics of the fluid filled bladder. After each of several straight line action clamps around the nozzle dam periphery has been set in the locked position, there is an equal radial force around the circumference of the bulkhead forcing the seal against the nozzle wall.

DESCRIPTION OF THE PREFERRED EMBODIMENTS

Figure 1:
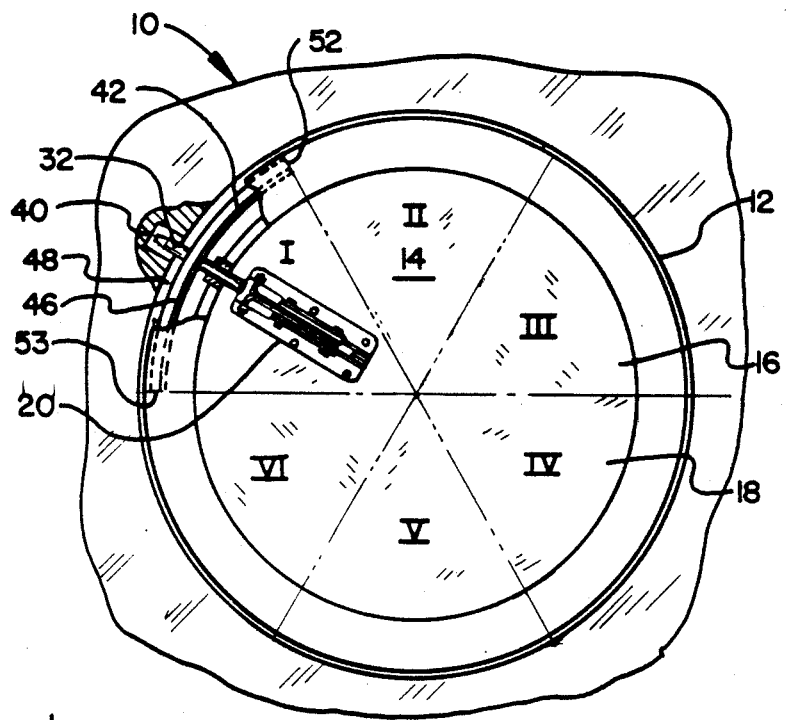
FIG. 1 is a fragmentary front elevational schematic view of the nozzle dam of the installed invention illustrating a single representative bladder segment and mechanical seal actuating assembly.
Figure 2:
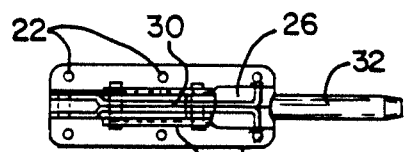
FIG. 2 is a plan view of a straight line toggle type action clamp of the type used in FIG. 1.
Figure 3:
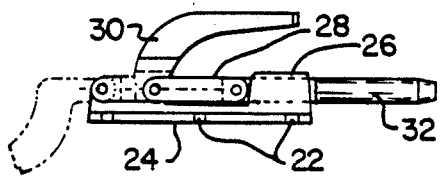
FIG. 3 is a side elevational view of the clamp of FIGS. 1 and 2.

The numeral 10 generally designates a steam generator structure through which a nozzle 12 passes. The nozzle 12, as shown, has mounted therein a passive nozzle dam 14 which utilizes radial force for sealing in accordance with the principles of this invention. As viewed from inside of the primary head of the steam generator 10, for instance, of a nuclear steam supply system, the nozzle dam 14 is divided into an upper component 16 and a lower component 18. The components 16 and 18 are segments of a circle and may be hinged or pinned in a manner described in the previously mentioned patents and fully understood by those skilled in the art. In their assembled condition, the component parts 16 and 18 make up the nozzle dam 14 which is divided into pie-shape circle sectors through which the radial sealing force is applied. As seen in FIG. 1, there are six sectors labeled by Roman numerals I through VI. For purposes of illustration, only sector I is illustrated in any detail but it is to be understood that all of the sectors are identically outfitted with the mechanical actuating device which provides the radial force for sealing. As will be seen in the sector I, a straight line toggle type action clamp 20 is mounted by means of a series of bolt holes 22, for example, to the aluminum bulkhead segment or component 16. The base 24 of the clamp through which bolt holes 22 extend has projecting therefrom a suitable barrel structure 26 and pivotal connections for a toggle link 28. Upon actuation of the clamp handle 30, a pin 32 is reciprocated by action of the toggle.

Figure 4:
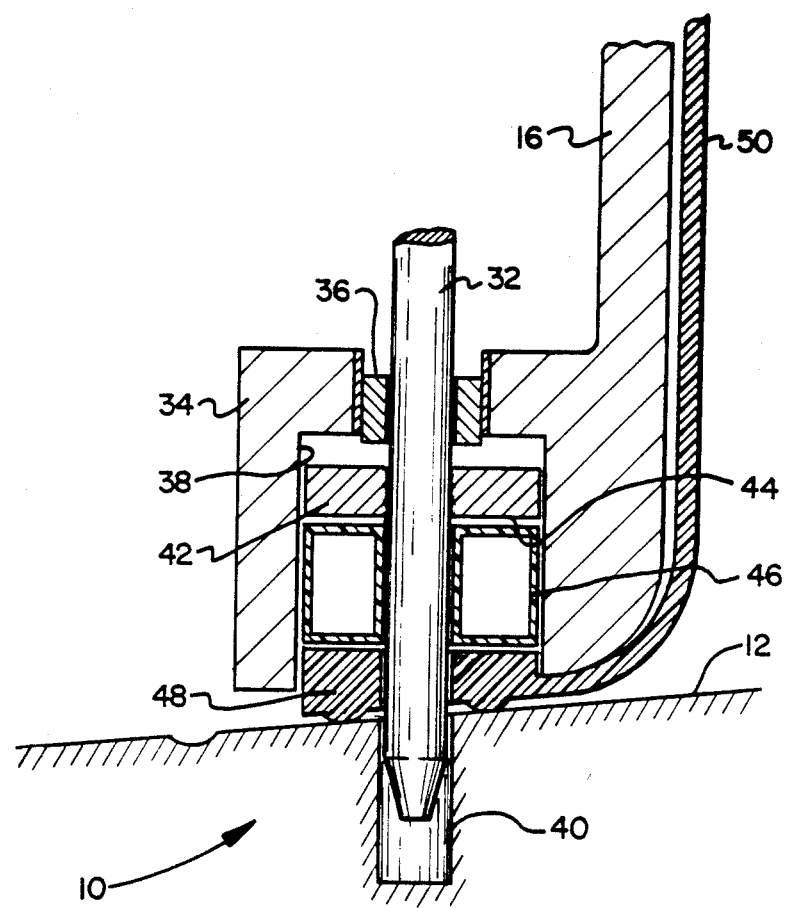
FIG. 4 is a fragmentary cross-sectional schematic view of the installed nozzle dam of FIG. 1, showing the relationship of the parts of the assembly.

As best seen in FIG. 4, the periphery of the aluminum component 16 has a flange structure 34 into which a guide bushing 36 is press-fit for purposes of guiding the pin 32 during its reciprocation. Press-fit on the pin 32 for movement therewith, in a cavity 38 which opens radially outwardly toward a pocket 40 in the nozzle surface 12, is a plunger member 42. The plunger member 42 has a surface 44 for applying a force against a bladder member 46 through which the pin 32 passes. The bladder 46 lies between the plunger member's force supplying surface 44 and a soft peripheral seal flange 48. Flange 48 is an integral part of a bladder 50 mounted on the nozzle dam 14 in a manner known to those skilled in the art and perhaps best illustrated in U.S. Pat. No. 4,656,714 at FIG. 7.

The bladder means 46 can either be cut off and ended at the boundaries 52 and 53 of the sector I or it can extend around the entire periphery of the diaphragm 50 inside of its peripheral flange or soft sealing portion 48. The integral rubber seal and diaphragm is made of a molded synthetic rubber which is resistant to heat and radiation. The bladder fluid is typically a hydraulic fluid containing glycol such as the "UCON" Hydraulic Fluid WS-34 of Union Carbide. This hydraulic fluid is a polyalkylene glycol mixture.

Thus, it will be seen that the proposed radial seal passive nozzle dam composed of aluminum bulkhead components that are hinged or quickly pinned together and a rubber diaphragm with a sealing ring that slips over the assembled bulkhead, may have a single integral fluid filled bladder 46, or, each sector I to VI of the aluminum bulkhead can contain discrete bladders. In either case, each component of the aluminum bulkhead contains sectors that have mechanical assemblies that are actuated, as by means of handles 30, to exert a radial force through the plunger means 42 and force supplying surface 44, against the soft sealing material 48, to make a seal against the nozzle surface 12. Each of the mechanical assemblies is composed of a straight line force supplier which, on the application of the force by means of the handle 30, also inserts the pin 32 into the pocket 40 to secure the nozzle dam 14 within the nozzle. By means of this arrangement, the locking pins 32 also provide for the retention of the diaphragm 50 in proper position during installation.

We claim:

1. A nozzle dam for use in sealing a steam generator nozzle which includes in combination:
   means forming a bulkhead;
   means forming a plunger movably mounted on said bulkhead;
   said plunger including a pin for engagement in a pocket in the wall of a nozzle in order to secure said bulkhead and means including a surface for applying a force mounted for movement with said pin;
   soft peripheral seal means about the periphery of said bulkhead;
   bladder means including a contained fluid between said means including a surface for applying a force and said soft peripheral seal means to exert an equalized force on the soft peripheral seal means when said plunger moves said pin into engagement with said pocket.

2. The nozzle dam combination of claim 1 in which the means forming a plunger include a straight line toggle type action clamp having a reciprocating pin.

3. The nozzle dam combination of claim 1 in which the bladder means is segmented around the periphery.

4. The nozzle dam combination of claim 1 in which the bladder means is a peripheral seal having a single fluid chamber.

5. The nozzle dam combination of claim 2 in which the means including a surface for applying a force is secured to the pin for movement with said pin.

6. The nozzle dam combination of claim 1 in which the fluid is a hydraulic fluid containing glycol.

* * * * *